United States Patent
Kawai et al.

(10) Patent No.: US 10,744,861 B2
(45) Date of Patent: Aug. 18, 2020

(54) WEATHER STRIP FOR AUTOMOBILE

(71) Applicant: TOYODA GOSEI CO., LTD., Kiyosu-shi, Aichi-ken (JP)

(72) Inventors: Tatsuya Kawai, Kiyosu (JP); Tomoaki Aiso, Kiyosu (JP); Daisuke Hokama, Kiyosu (JP); Kiminori Mine, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 67 days.

(21) Appl. No.: 15/983,184

(22) Filed: May 18, 2018

(65) Prior Publication Data

US 2018/0354352 A1 Dec. 13, 2018

(30) Foreign Application Priority Data

Jun. 9, 2017 (JP) ................ 2017-114191

(51) Int. Cl.
*B60J 10/21* (2016.01)
*B60J 10/16* (2016.01)
(Continued)

(52) U.S. Cl.
CPC ............ *B60J 10/21* (2016.02); *B60J 10/16* (2016.02); *B60J 10/23* (2016.02); *B60J 10/24* (2016.02);
(Continued)

(58) Field of Classification Search
CPC ... B60J 10/23; B60J 10/21; B60J 10/86; B60J 10/16; B60J 10/24; B60J 10/27; B60J 10/84; B60J 10/80
See application file for complete search history.

(56) References Cited

U.S. PATENT DOCUMENTS 4,769,947 A * 9/1988 Ogawa .................. B60J 10/21
249/63
5,222,336 A * 6/1993 Yada .................... B62D 25/04
296/93
(Continued)

FOREIGN PATENT DOCUMENTS

JP 2002-337551 A 11/2002
JP 2006-82679 A 3/2006
(Continued)

OTHER PUBLICATIONS

English translation of JP2002337551.*
Japanese Office Action dated Jun. 11, 2020 issued in corresponding JP application No. 2017-114191.

*Primary Examiner* — Justin B Rephann
(74) *Attorney, Agent, or Firm* — Posz Law Group, PLC

(57) ABSTRACT

The weather strip for an automobile includes an extrusion formed portion and a molding formed portion and each includes an attaching base portion and a sealing portion. The attaching base portion includes an attaching base portion bottom side portion which faces the outer peripheral portion of the opening and closing member for the opening of the vehicle body or the outer peripheral brim of the opening. A core removing slit is formed at the attaching base portion bottom side portion extending in a longitudinal direction and a connecting sheet provided for covering an outer surface of the attaching base portion bottom side portion by crossing over the core removing slit, The connecting sheet is formed by an olefin system resin and a surface of the connecting sheet facing the attaching base portion bottom side portion is fusion-bonded to the outer surface of the attaching base portion bottom side portion.

17 Claims, 8 Drawing Sheets

(51) Int. Cl.
  *B60J 10/24* (2016.01)
  *B60J 10/86* (2016.01)
  *B60J 10/23* (2016.01)
  *B60J 10/84* (2016.01)
  *B60J 10/15* (2016.01)

(52) U.S. Cl.
  CPC ............... *B60J 10/84* (2016.02); *B60J 10/86* (2016.02); *B60J 10/15* (2016.02)

(56) References Cited

U.S. PATENT DOCUMENTS

| | | | | |
|---|---|---|---|---|
| 5,258,157 | A * | 11/1993 | Nozaki | B29C 33/0044 264/261 |
| 5,269,101 | A * | 12/1993 | Nozaki | B60J 10/21 49/479.1 |
| 5,976,438 | A * | 11/1999 | Hamabata | B29C 45/14409 264/138 |
| 6,237,287 | B1 * | 5/2001 | Nakagawa | B60J 10/21 49/479.1 |
| 6,395,355 | B1 * | 5/2002 | Nakajima | B29C 45/14409 428/34.1 |
| 6,598,347 | B2 * | 7/2003 | Hattori | B60J 10/24 49/479.1 |
| 9,708,846 | B2 * | 7/2017 | Masumoto | B60J 10/27 |
| 2004/0247827 | A1 * | 12/2004 | Kubo | B29C 45/0053 428/136 |
| 2004/0250474 | A1 * | 12/2004 | Kubo | B29C 45/0053 49/479.1 |
| 2005/0008819 | A1 * | 1/2005 | Kubo | B29C 45/14409 428/122 |
| 2006/0073727 | A1 * | 4/2006 | Kimura | B29C 45/14409 439/441 |
| 2006/0162257 | A1 * | 7/2006 | Nozaki | B60J 10/16 49/490.1 |
| 2014/0109485 | A1 * | 4/2014 | Murree | B29D 99/0053 49/498.1 |
| 2016/0144697 | A1 * | 5/2016 | Samanci | B60J 10/21 49/479.1 |

FOREIGN PATENT DOCUMENTS

| | | |
|---|---|---|
| JP | 2009-83639 A | 4/2009 |
| JP | 2011-207255 A | 10/2011 |
| JP | 2012-116338 A | 6/2012 |

\* cited by examiner

WEATHER STRIP FOR AUTOMOBILE

This application claims priority under 35 U.S.C. 119 with respect to Japanese Application No. 2017-114191 filed in Japan on Jun. 9, 2017, the entire content of which is herein incorporated by reference.

BACKGROUND OF THE INVENTION

Field of the Invention

This invention relates to a weather strip for an automobile which seals a portion between the peripheral brim of an opening of the vehicle body of an automobile and an opening and closing member for the opening of the vehicle body.

Description of Related Art

Usually, sealing between the peripheral brim of the opening of the vehicle body of the automobile and the opening and closing member for the opening of the vehicle body, for example, sealing between the peripheral brim of the opening of the vehicle body and the door panel 1 and the door frame 2 is made as shown in FIG. 7, by the door weather strip 110 which is attached to the outer peripheral portion between the door panel 1 and the door frame 2 and/or an opening trim weather strip which is attached to the flange portion of the peripheral brim of the opening of the vehicle body. It is noted that the sealing between the door glass 5 and the door frame 2 is made by the glass run which is attached to the inner peripheral channel provided at the door frame 2.

The door weather strip 110 which is attached to the outer peripheral portion between the door frame 2 and the door panel 1 is formed by an attaching base portion 120 and a sealing portion formed integrally at the upper portion of the attaching base portion 120, as shown in FIG. 14 and the sealing portion is formed by a hollow sealing portion 130 and a sealing lip portion 140. The attaching base portion 120 is fitted into a retainer attached to the outer peripheral portion of the door panel 1 and the door frame 2 to be fixed thereto.

Further, there may be a case that the door weather strip 110 has different cross sectional shapes between a portion which is installed in the door frame 2 and a portion which is installed in the door panel 1. In such case, as shown in FIG. 6, the door weather strip 110 may be provided with a connecting portion 115 formed by molding in the vicinity of joint portion between the door frame 2 and the door panel 1. Further, the weather strip 110 is provided with a molding formed portion 110b formed by molding at the corner of the door frame 2 for bending the corner portion 112 for connection.

An extrusion formed portion 110a of the door weather strip 110 is provided with an attaching base portion hollow portion 122 which is formed in a hollow shape in order to improve the flexibility of the hollow sealing portion 130 and the attaching base portion 120 and to achieve reduction of weight. Further, a hollow sealing bridge portion 125 is provided between the hollow sealing portion 130 and the attaching base portion hollow portion 122 where the peripheral brim of the opening of the vehicle body is brought into contact to connect the end portions of the outer wall portion of the hollow sealing portion 130.

However, when using thus formed molding formed portion 110b, in order to form a hollow portion in the hollow sealing portion 130, it is necessary to provide a core member in the molding die and after molding forming it is further necessary to remove the core member from a core removing slit 124 provided in the attaching base portion 120 of the molding formed portion 110b.

For this reason, as shown in FIG. 14, in order to remove the core member, the core removing slit 124 is formed on the molding formed portion 110b and the core removing slit 124 is formed up to around a connecting surface 118 between the extrusion formed portion 110a and the molding formed portion 110b.

In order to keep the outer profile (shape) of the molding formed portion 110b, it is necessary to fix the core removing slit 124 not to generate mouth-opening.

Such fixing of the core removing slit 124 is made by using instant adhesion agent or the like. However, since a liquid type agent is usually used for the instant adhesion agent, it is necessary to carefully handle such liquid agent. Sometimes such liquid instant adhesion agent may protrude from the slit 124 or may adhered on to an ornamental surface of the door weather strip 110 and a sealing surface thereof, which may lead to a generation of failure. Further, since a very few amounts of the instant adhesion agent is handled in the adhesion work, a deviation of adhesive force of the core removing slit 124 may be generated.

Further, as a fixing method for fixing the core removing slit 124, a connecting pin is used for covering the slit using a driving tool (See an example in the Patent Document 1). In this method, it was necessary to use the driving tool and workability was not good.

Still further, as shown in FIG. 14, an attaching plate 150 is used for covering the slit 124 (See an example in the Patent Document 2). According to the fixing of the attaching plate 150, the fixing pin 151 of the attaching plate 150 is inserted into the fixing bore of the attaching base portion 120. However, in this method, it takes relatively a long time for the work to attach the fixing pin 151 of the attaching plate 150 into the fixing bore of the attaching base portion 120.

DOCUMENT LIST OF RELATED ART

Patent Document

Patent Document 1: JP2012-116338 A
Patent Document 2: JP2002-337551 A

DISCLOSURE OF INVENTION

The invention was made to solve the above drawbacks of the conventional technologies, and the object of the invention is to provide a weather strip for an automobile which can prevent a core removing slit of an attaching base portion from mouth-opening and at the same time which can be easily manufactured.

In order to solve the above problems, according to a first aspect of the invention, the weather strip for an automobile which seals a portion between a peripheral brim of an opening of the vehicle body of the automobile and an opening and closing member for the opening of the vehicle body includes an extrusion formed portion and a molding formed portion which connects each end portion of the extrusion formed portion, wherein the extrusion formed portion and the molding formed portion respectively include an attaching base portion attached to an outer peripheral portion of the opening and closing member for the opening of the vehicle body or the peripheral brim of the opening of the vehicle body and a sealing portion formed integrally with the attaching base portion for sealing between the peripheral brim of an opening of the vehicle body and the opening and closing member for the opening of the vehicle body by being in contact with the peripheral brim of the opening of the vehicle body or the outer peripheral portion of the opening and closing member for the opening of the vehicle body, the attaching base portion having an attaching base portion bottom side portion with plate-like shape which faces the outer peripheral portion of the opening and closing member for the opening of the vehicle body or the peripheral brim of the opening of the vehicle body, and wherein the weather strip is characterized in that a core removing slit is formed at the attaching base portion bottom side portion of the molding formed portion extending in a longitudinal direction of the weather strip and a connecting sheet is provided which covers an outer surface of the attaching base portion bottom side portion by crossing over the core removing slit and the connecting sheet is formed by an olefin resin and at the same time a surface of the connecting sheet facing the attaching base portion bottom side portion is fusion-bonded to an outer surface of the attaching base portion bottom side portion.

According to the first aspect of the invention, the weather strip for an automobile which seals a portion between the peripheral brim of the opening of the vehicle body of the automobile and the opening and closing member for the opening of the vehicle body includes an extrusion formed portion and a molding formed portion which connects each end portion of the extrusion formed portion, wherein the extrusion formed portion and the molding formed portion respectively include an attaching base portion attached to an outer peripheral portion of the opening and closing member for the opening of the vehicle body or the peripheral brim of the opening of the vehicle body and a sealing portion which is formed integrally with the attaching base portion for sealing the portion between the peripheral brim of an opening of the vehicle body and the opening and closing member for the opening of the vehicle body by being in contact with the peripheral brim of the opening of the vehicle body or the outer peripheral portion of the opening and closing member for the opening of the vehicle body. The attaching base portion has a plate shape attaching base portion bottom side portion which faces the outer peripheral portion of the opening and closing member for the opening of the vehicle body or the peripheral brim of the opening of the vehicle body.

Accordingly, the extrusion formed portion is quickly formed by extrusion forming and is connected to the molding formed portion which is formed by molding. Thus, the shape of the weather strip can be formed to agree to the shape of the corner portion of the opening and closing member for the opening of the vehicle body or the shape of the corner portion of the peripheral brim of the opening of the vehicle body. Since the sealing portion is held at the outer peripheral portion of the opening and closing member for the opening of the vehicle body or the peripheral brim of the opening of the vehicle body, the position of the sealing member is kept stable and is surely brought into contact with either the peripheral brim of the opening of the vehicle body or the outer peripheral portion of the opening and closing member for the opening of the vehicle body to assure the sealing performance thereof.

Since attaching base portion bottom side portion with plate-like shape the outer peripheral portion of the opening and closing member for the opening of the vehicle body or the peripheral brim of the opening of the vehicle body is provided, the outer peripheral portion of the opening and closing member for the opening of the vehicle body or the peripheral brim of the opening of the vehicle body is closely brought into contact with the attaching base portion bottom side portion thereby to attach the attaching base portion in a stable manner.

Since the core removing slit is formed at the attaching base portion bottom side portion of the molding formed portion and the slit extends in a longitudinal direction of the weather strip, the core member can be easily removed from the core removing slit after mold forming.

Further, since the connecting sheet is provided which covers the outer surface of the attaching base portion bottom side portion by crossing over the core removing slit, a mouth-opening of the core removing slit can be prevented by the connecting sheet.

Since the connecting sheet is formed by an olefin resin and at the same time a surface of the connecting sheet facing the attaching base portion bottom side portion is fusion-bonded to the outer surface of the attaching base portion bottom side portion, the connecting sheet can be firmly attached on to the outer surface of the attaching base portion. Further, since the connecting sheet is fusion-bonded to the attaching base portion bottom side portion, by simply pushing the connecting sheet by ultrasonic fusion machine or the like, the fusion bonding can be easily performed to make the attaching process of the connecting sheet to be simplified thereby to improve the attaching work efficiency.

The invention of a second aspect includes the weather strip which is formed with a plurality of uneven portions on the outer surface of the connecting sheet.

According to the second aspect of the invention, the plurality of uneven portions is formed on the outer surface of the connecting sheet by forming a plurality of grooves on the pushing surface of the tip end of the ultrasonic vibrator in advance to bite into the connecting sheet upon welding thereby to surely hold the connecting sheet for effectively transmitting vibrations upon ultrasonic welding of the connecting sheet and the attaching base portion bottom side portion. Thus, the connecting sheet and the outer surface of the attaching base portion bottom side portion can be firmly fusion-bonded.

The invention of a third aspect includes the weather strip wherein the plurality of uneven portions on the outer surface of the connecting sheet is formed in a lattice shape.

According to the third aspect of the invention, a lattice shaped plurality of uneven portions is formed on the outer surface of the connecting sheet by forming a lattice shaped plurality of grooves on the pushing surface of the tip end of the ultrasonic vibrator in advance to bite into the connecting sheet upon welding thereby to surely hold the connecting sheet for effectively transmitting vibrations upon ultrasonic welding of the connecting sheet and the attaching base portion bottom side portion. Thus, the connecting sheet and the outer surface of the attaching base portion bottom side portion can be firmly fusion-bonded.

The invention of a fourth aspect includes the weather strip which is formed with an attaching base portion bottom side portion recessed portion formed on the outer surface of the attaching base portion bottom side portion for accommodating the connecting sheet therein.

According to the fourth aspect of the invention, since the attaching base portion bottom side portion recessed portion is formed on the outer surface of the attaching base portion bottom side portion for accommodating the connecting sheet therein, the connecting sheet can be surely fusion-bonded to a predetermined position of the outer surface of the attaching base portion bottom side portion. The expanding of the connecting sheet out of the outer surface of the attaching base portion bottom side portion can be minimized to surely assure the sealing performance between the outer surface of the attaching base portion bottom side portion and the peripheral brim of the opening of the vehicle body or the opening and closing member for the opening of the vehicle body.

The invention of a fifth aspect includes the weather strip which is formed with the connecting sheet formed by a plurality of rectangular strips which covers the core removing slit.

According to the fifth aspect of the invention, the connecting sheets is formed by the plurality of rectangular strips which covers the core removing slit. Since the molding formed portion itself is set in a range small as possible, the length of the core removing slit becomes not long in response to the length of the molding formed portion and accordingly, even the plurality of rectangular strips is used for forming the connecting sheet, the mouth-opening of the slit can be sufficiently prevented. Further, when a plurality of rectangular strips is used for forming the connecting sheet, a smaller ultrasonic vibrator can be used. Further, the plurality of smaller rectangular strips used for the connecting sheet has a high versatility and accordingly has a high efficiency.

The invention of a sixth aspect includes the weather strip which is formed with the connecting sheet fusion-bonded to the outer surface of the attaching base portion bottom side portion and provided consecutively in a width direction of both sides of the attaching base portion bottom side portion, crossing over the core removing slit.

According to the sixth aspect of the invention, the connecting sheet is fusion-bonded to the outer surface of the attaching base portion bottom side portion provided consecutively in a width direction of both sides of the attaching base portion bottom side portion, crossing over the core removing slit. Therefore, the attaching base portion bottom side portion fusion-bonded under the core removing slit being closed is consecutively fusion-bonded such that the core removing slit and the attaching base portion bottom side portion at both sides are consecutively bonded not to make any step on the outer surfaces of the attaching base portion bottom side portion at both sides. Thus, the sealing performance can be improved without causing any interruption. Further, since the fusion-bonding is made on only the central portion of the connecting sheet, preparation of any specific shape ultrasonic vibrator is not necessary, and the fusion-bonding workability can be improved to surely prevent the core removing slit from an undesired opening.

The invention of a seventh aspect includes the weather strip wherein the fusion-bonding portion of the attaching base portion bottom side portion to which the connection sheet is fusion-bonded is in a shape of a flat surface.

According to the seventh aspect of the invention, since the fusion-bonding portion between the connecting sheet and the outer surface of the attaching base portion bottom side portion is in a shape of flat surface, the connecting sheet can be consecutively closely bonded to the outer surface of the attaching base portion bottom side portion and a pushing force can be applied evenly on the connecting sheet upon fusion bonding. Thus, the connecting sheet and the outer surface of the attaching base portion bottom side portion can be surely fusion-bonded.

The invention of an eighth aspect includes the weather strip wherein the reinforcement ribs are formed at an inner surface of the core removing slit of the attaching base bottom side portion at both sides.

According to the eighth aspect of the invention, since the reinforcement ribs are formed at the inner surface of the core removing slit of the attaching base bottom side portion at both sides, the attaching base portion bottom side portion can be supported by the reinforcement ribs when the connecting sheet is pushed on the outer surface of the attaching base portion bottom side portion to be in closely contact therewith. Thus, any deformation of the attaching base portion bottom side portion can be minimized, and the connecting sheet and the outer surface of the attaching base portion bottom side portion can be surely fusion-bonded.

The invention of a ninth aspect includes the weather strip wherein an opening surface of the core removing slit of the attaching base portion bottom side portion includes an engaging portion having an uneven surface or a stepped surface.

According to the ninth aspect of the invention, since the opening surface of the core removing slit of the attaching base portion bottom side portion includes the engaging portion having the uneven surface or the stepped surface, the opening surface of the core removing slit at both sides is not deviated when the connecting sheet is attached to the outer surface of the attaching base portion bottom side portion and the connecting sheet and the outer surface of the attaching base portion bottom side portion can be surely fusion-bonded.

The invention of a tenth aspect includes the weather strip wherein the connecting sheet is formed by a polyethylene and the weather strip is formed by an EPDM rubber material.

According to the tenth aspect of the invention, since the connecting sheet is formed by a polyethylene and the weather strip is formed by an EPDM rubber material, both the connecting sheet and the attaching base portion bottom side portion are formed by the same olefin system materials and accordingly, both are mutually easily fused to firmly fusion-bond the connecting sheet and the attaching base portion bottom side portion.

Effect of Invention

Since the connecting sheet is provided which covers the outer surface of the attaching base portion bottom side portion crossing over the core removing slit, a mouth-opening of the core removing slit can be prevented.

Further, since the connecting sheet is formed by the olefin system resin material and at the same time the surface of the connecting sheet facing the attaching base portion bottom side portion is fusion-bonded to the outer surface of the attaching base portion bottom side portion, the connecting sheet can be firmly fixed to the outer surface of the attaching base portion bottom side portion and at the same time both can be easily bonded by using a ultrasonic fusion bonding machine to easily achieve the attaching work of the connecting sheet to thereby improve the efficiency of attaching work.

BRIEF DESCRIPTION OF THE ATTACHED DRAWINGS

Various aspects of this invention will become apparent to those skilled in the art from the following detailed description of the preferred embodiments, when read in light of the accompanying drawings, in which.

Figure 11:
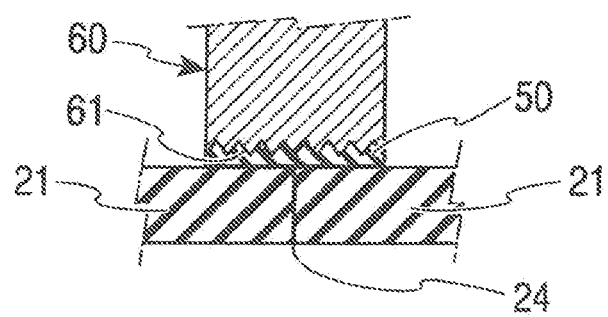
Figure 12:
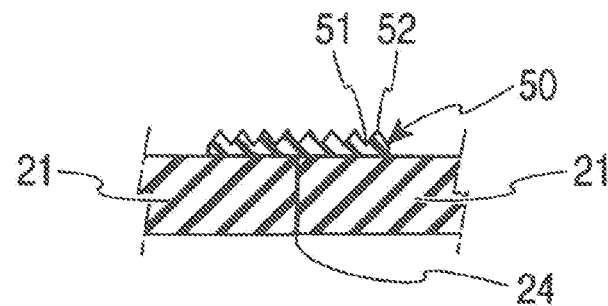
Figure 13:
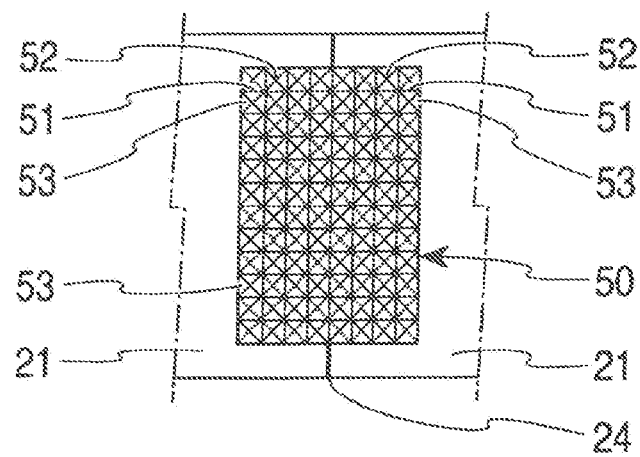
Figure 14:
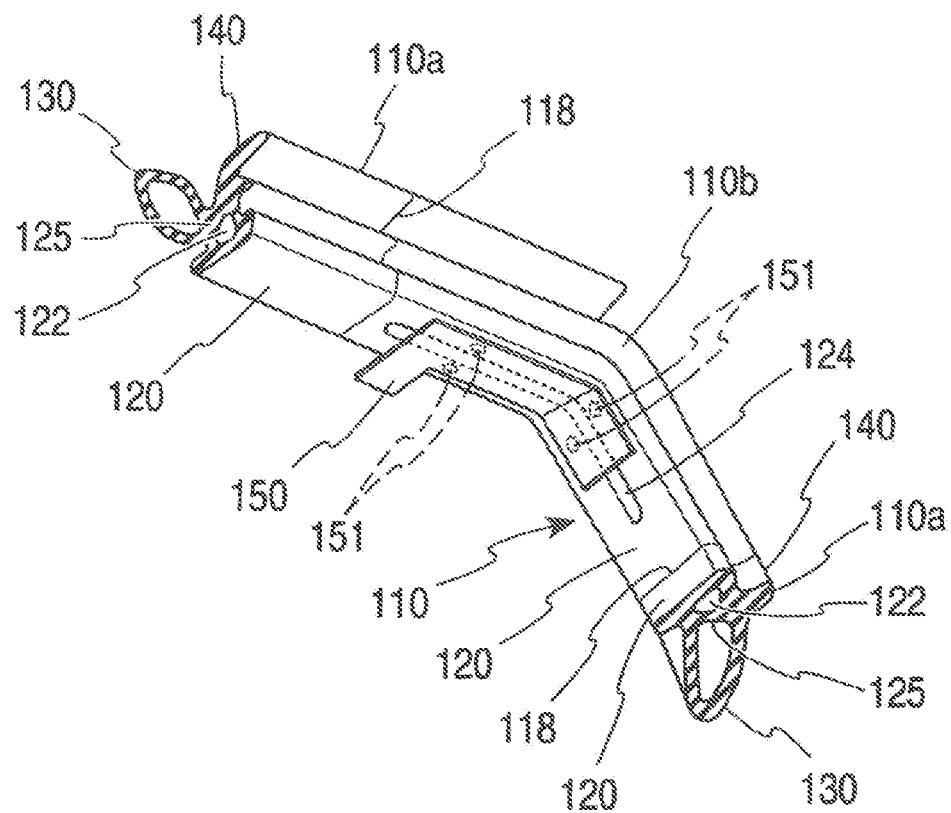

FIG. 11 is a schematic view of a process for fusion-bonding the connecting sheet to the attaching base portion bottom side portion of the door weather strip according to the embodiment of the invention, and showing a schematic view of a process showing the connecting sheet being closely brought into contact with the core removing slit and fusion-bonding by the vibrator of the ultrasonic fusion-bonding machine;

FIG. 12 is a schematic view of a process for fusion-bonding the connecting sheet to the attaching base portion bottom side portion of the door weather strip according to the embodiment of the invention, and showing a schematic view of a process after the connecting sheet is fusion-bonded to the core removing slit;

FIG. 13 is a schematic view of a process for fusion-bonding the connecting sheet to the attaching base portion bottom side portion of the door weather strip according to the embodiment of the invention, and showing a plan view of the connecting sheet after fusion-bonded to the core removing slit; and FIG. 14 is a perspective view of the rear side of the connecting portion of the corner portion of the opening weather strip according to a conventional structure.

DETAILED DESCRIPTION OF THE PREFERRED EMBODIMENTS OF THE INVENTION

The preferred embodiments of the door weather strip 10 according to one embodiment of the invention will be explained hereinafter with reference to FIGS. 1 through 13 of the attached drawings. The door weather strip according to the embodiment can be used widely for any type of the weather strip other than the door weather strip, such as an opening weather strip which is attached to the peripheral brim 6 of the opening of the vehicle body, a luggage door weather strip which is attached to the luggage door, or a glass run, etc.

Figure 1:
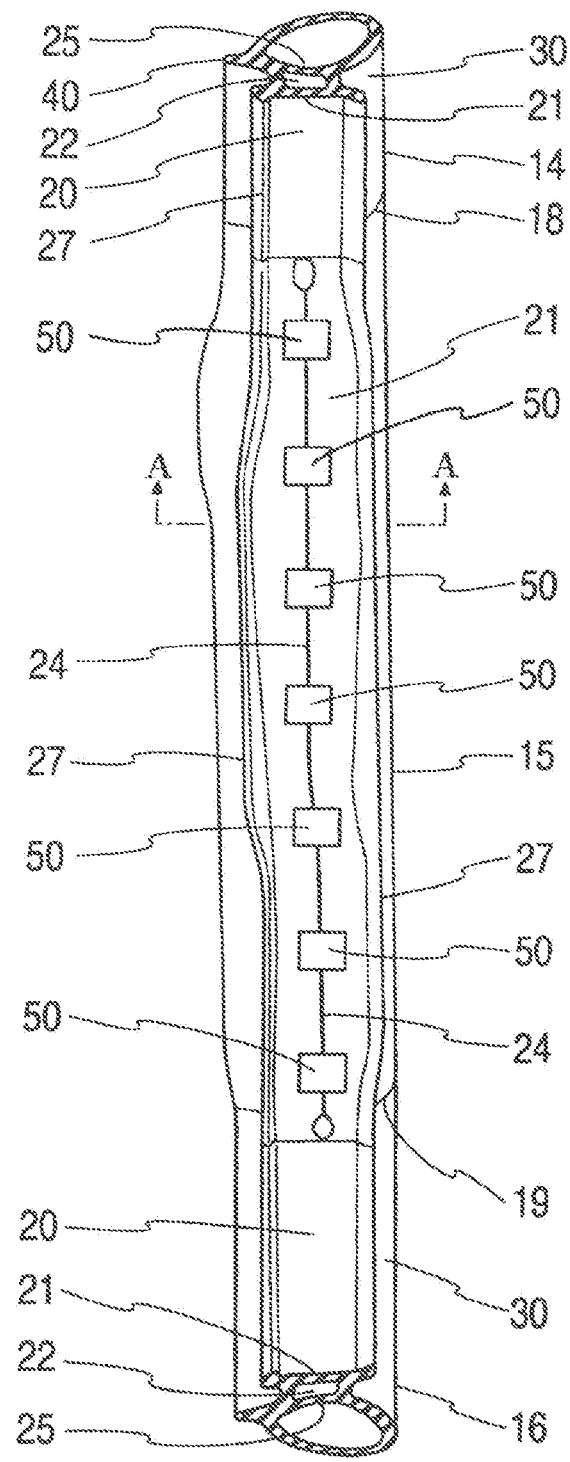
FIG. 1 is a bottom plan view of a molding formed portion of a vertical side connecting portion of a door weather strip according to an embodiment of the invention.
Figure 2:
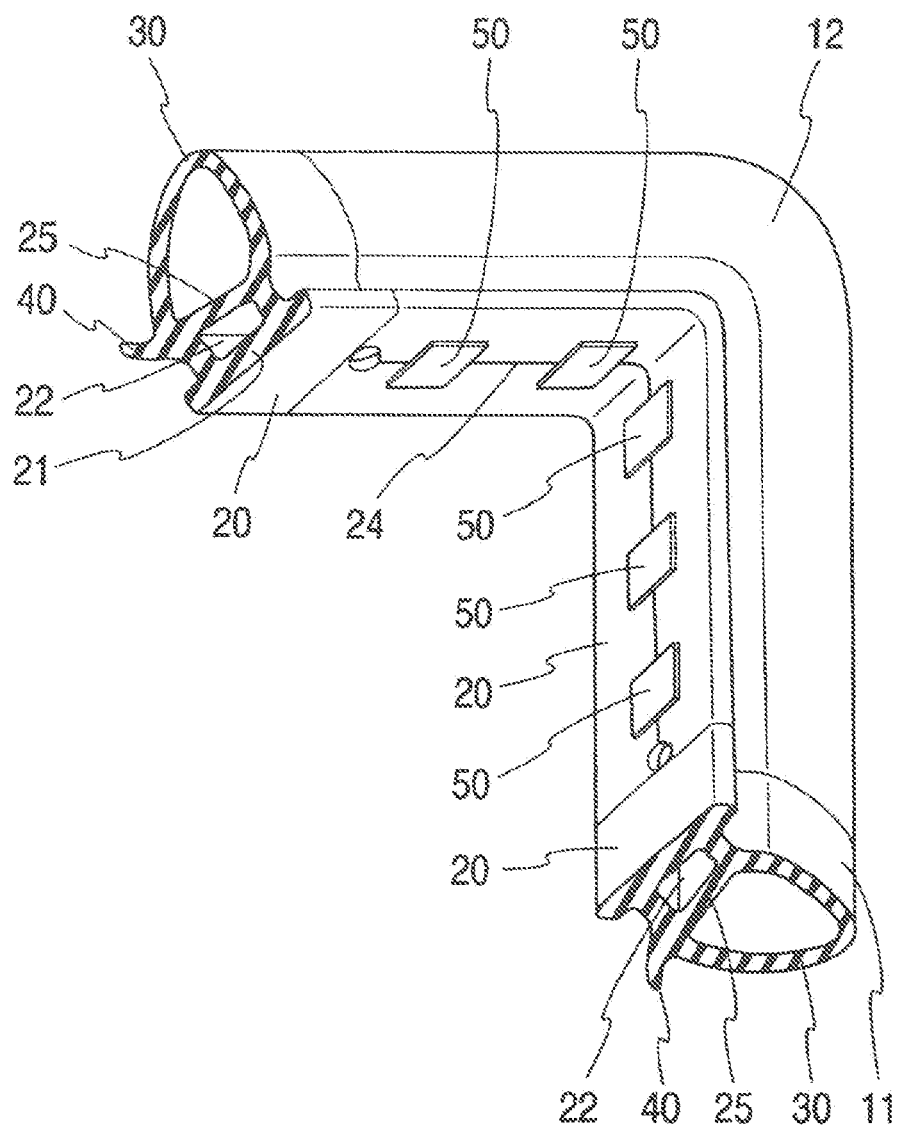
FIG. 2 is a perspective view showing a bottom surface of the molding formed portion of a corner portion of another door weather strip according to the embodiment of the invention.
Figure 3:
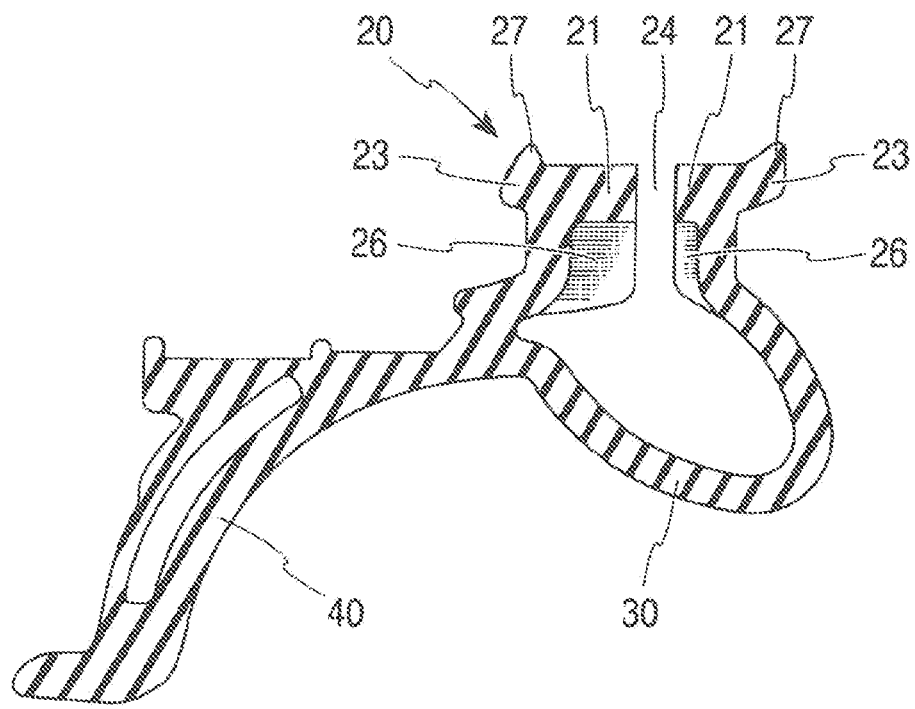
FIG. 3 is a cross section view of the molding formed portion of the door weather strip of the embodiment of the invention, taken along the line A-A in FIG. 1.
Figure 6:
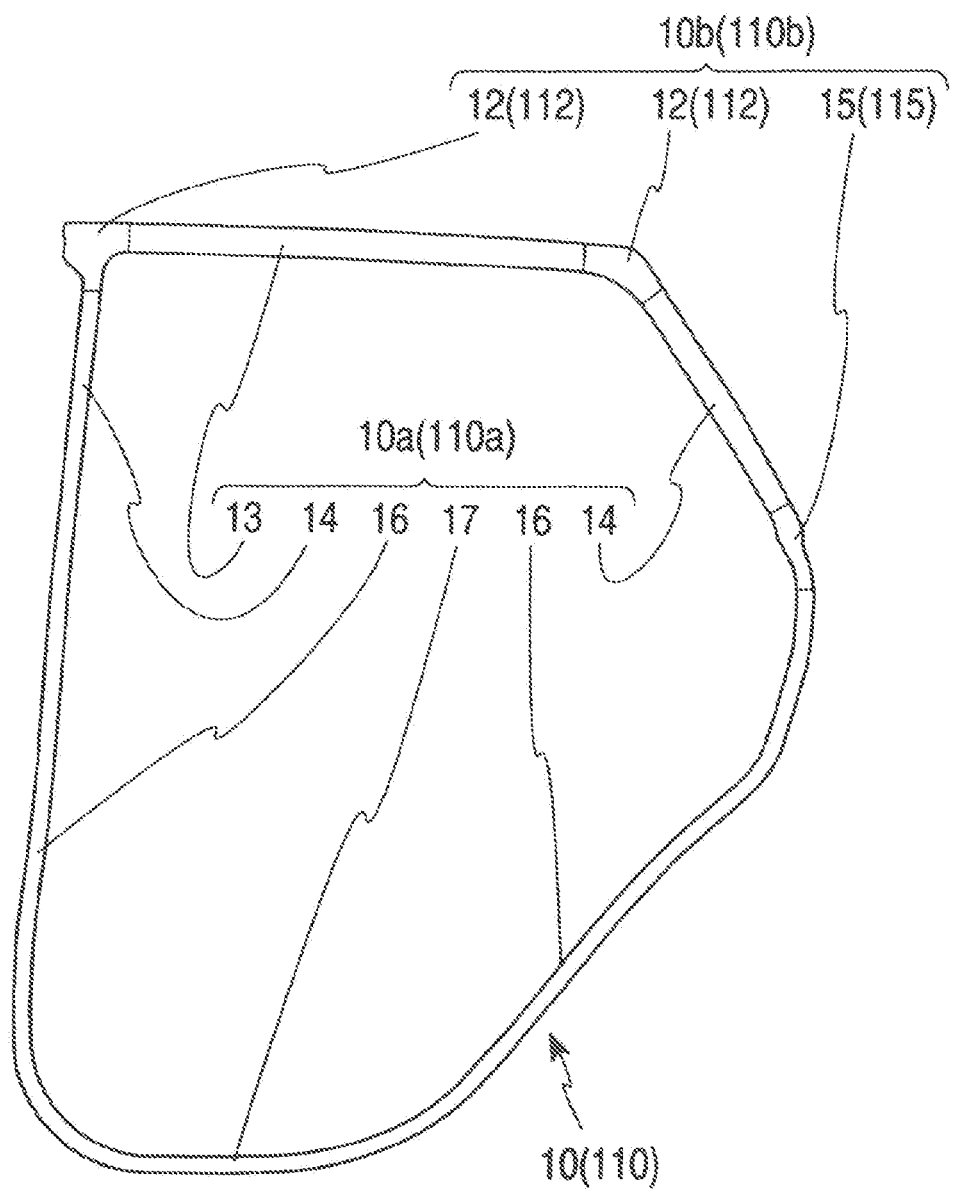
FIG. 6 is a plan view of the door weather strip according to the embodiment.
Figure 7:
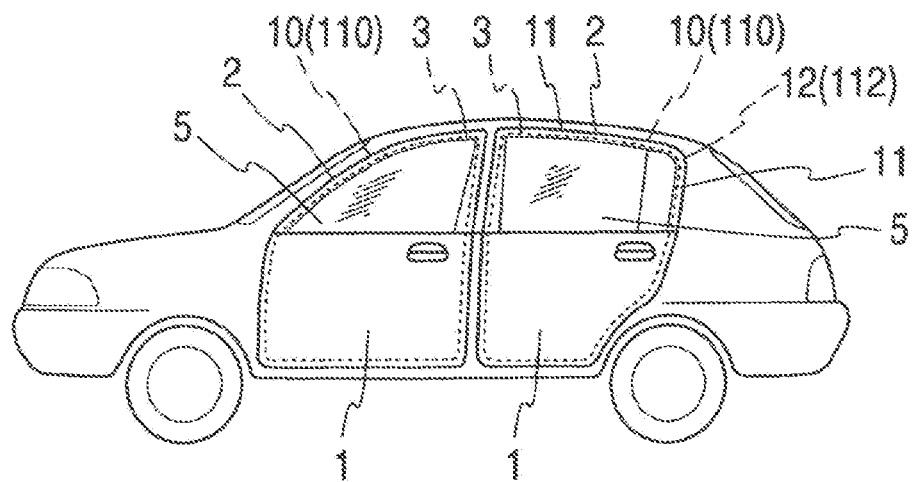
FIG. 7 is a side view of an automobile.

FIG. 7 shows a side view of an automobile to which the door weather strip 10 according to the invention is installed. FIG. 6 is a view showing the entire front side of the door weather strip 10. to be installed to the door panel 1 and the door frame 2. FIG. 1 shows the bottom plan view of the later described attaching base portion 20 of the vertical side connecting portion 15. FIG. 2 shows a bottom plan view of the later described attaching base portion 20 of the corner portion 12 and FIG. 3 shows a cross section view taken along the line A-A in FIG. 1

The door weather strip 10 is installed at the outer peripheral portion of the automobile door which is formed by the door panel 1 and the door frame 2. According to the embodiment, the door weather strip 10 to be installed at the rear door will be explained, however the invention can be applicable to the door weather strip 10 to be installed at the front door.

The door weather strip 10 is formed by an extrusion formed portion 10a which is formed by extrusion and a molding formed portion 10b which is formed by molding to form the corner portion 12 and the vertical side portion 15 connecting the end portions of each extrusion formed portion 10a.

As shown in FIG. 6, the extrusion formed portion 10a is formed by the upper side portion 13 which is attached to the upper side of the door frame 2, the vertical side upper portions 14 which are attached to the vertical side portion of the door frame 2 at front side and rear side thereof respectively, the vertical side lower portions 16, 16 which are attached to the vertical sides of the outer peripheral portion of the door panel 1 at front side and rear side thereof and a lower side portion 17 which is attached to the lower side of the door panel 1. The lower side portion 17 can be integrally molded consecutively with the vertical side lower portions 16, 16 by extrusion. It is noted that the lower side portion 17 can be omitted, by forming only the vertical side power portions 16, 16.

As shown in FIG. 1, the vertical side upper portion 14 and the vertical side lower portion 16 are formed by the attaching base portion 20 and the hollow sealing portion 30 and the sealing lip 40 integrally formed from the attaching base portion 20.

The attaching base bottom side portion 21 is formed at the lower side of the attaching base portion 20. The attaching base sealing projections 27 are formed at both side ends of the attaching base portion bottom side portion 21 to assure the sealing performance between the door frame 2 and the attaching base portion 20.

The attaching base portion hollow portion 22 is formed inside of the attaching base portion 20 of the vertical side upper portion 14 and the vertical side lower portion 16 adjacent to the hollow sealing portion 30 This can increase the flexibility of the attaching base portion 20 and makes the door weather strip 10 to be easily bendable for installing along the door frame 2 and the door panel 1 to further decrease the weight.

The sealing bridge portion 25 is formed between the hollow sealing portion 30 and the attaching base portion hollow portion 22 at the extrusion formed portion 10a to improve the rigidity of the hollow sealing portion 30 and at the same time to prevent from abnormal deformation thereof. Thus, the sealing performance at the hollow sealing portion 30 can be improved. However, as will be explained later, the hollow sealing bridge portion 25 is not provided in the attaching base portion 20 of the vertical side connecting portion 15 which forms the molding formed portion 10b. This is because the core member in the molding mold has to be removed therefrom.

The molding formed portion 10b is attached to the joint portion with the corner of the door frame 2 and is formed by the corner portions 12, 12 which connect the upper side portion 13 and the vertical side upper portion 14 and the vertical side connecting portion 15 which connects the vertical side upper portion 14 and the vertical side lower portion 16 at the joint portion between the rear side of the door frame 2 and the door panel 1. It is noted that the vertical side connecting portion 15 may be provided at the joint portion between the front side of the door frame 2 and the door panel 1. However, in this embodiment, the vertical side connecting portion 15 is not provided and instead, the vertical side upper portion 14 and the vertical side lower portion 16 are consecutively formed integrally.

It is noted here that the extrusion formed portion 10a and the molding formed portion 10b respectively include the attaching base portion 20 and the hollow sealing portion 30 as will be explained later. The cross section of the molding formed portion 10b gradually changes the shape thereof from one end to the other end, when the molding formed portion 10b is connected with the extrusion formed portion 10a with different cross section in shape from that of the molding formed portion 10b.

An embodiment of the invention regarding to the vertical side connecting portion 15 will be explained. As an example, the vertical side connecting portion 15 which connects the vertical side upper portion 14 and the vertical side lower portion 16 at the joint portion between the rear side of the door panel 1 and the door frame 2 of the door weather strip 10 at the rear door. The molding formed portion 10b attached to the front side connecting portion or to the front side door is formed similarly. As shown in FIG. 1, at the connecting part connecting the vertical side upper portion 14 and the vertical side connecting portion 15, the upper portion connecting surface 18 is provided and the lower portion connecting surface 19 is provided at the connecting portion connecting the vertical side lower portion 16 and the vertical side connecting portion 15. The explanation on the corner portion 12 will be made later on.

Approximately the central portion of the vertical side connecting portion 15, i.e., the shape of a part along the line A-A in FIG. 1 will be explained hereinafter. The vertical side connecting portion 15 of the door weather strip 10 is formed by the attaching base portion 20 which is attached to the door panel 1 and the hollow sealing portion 30 which is formed integrally with the attaching base portion 20 and is brought into contact with the peripheral brim 6 of the opening of the vehicle body.

The hollow sealing portion 30 is provided with a sealing lip 40 which is brought into contact with the door panel 1 or the door frame 2. The hollow sealing portion 30 seals a portion between the door panel 1 or the door frame 2 and the peripheral brim 6 of the opening of the vehicle body and the sealing lip portion 40 seals a portion between the door panel 1 or the door frame 2 and the door weather strip 10.

The bottom side of the attaching base portion 20 is formed with a plate shaped attaching base portion bottom side portion 21 and at each end of each side thereof, the attaching base portion side end 23, 23 is formed. The attaching base portion side ends 23, 23 are supported by the channels or the like formed by bending a sheet metal of the door panel 1. The attaching base portion sealing projections 27, 27 are formed on the surfaces of the attaching base side ends 23, 23 at both sides which are to be in contact with the door panel 1. The attaching base portion sealing projections 27, 27 are formed extending in a longitudinal direction.

The attaching base portion sealing projections 27, 27 seal the portion between the door panel 1 and the attaching base portion 20. By providing the attaching base portion sealing projections 27, 27 at both sides on the outer surface of the attaching base portion bottom side portion 21, an entering of foreign object or a rain water from the gap between the attaching base portion 20 of the door weather strip 10 and the outer peripheral portion of the door can be prevented over a wide range of the outer periphery of the door.

The core removing slit 24 is formed at the attaching base portion bottom side portion 21 for removing the core member in the molding to mold the hollow sealing portion 30 upon mold forming process. The core removing slit 24 continues to the inside of the hollow sealing portion 30. In other words, since the hollow sealing bridge portion 25 is not provided, the attaching base portion hollow portion 22 and the inside of the hollow sealing portion 30 are formed integrally and accordingly, the core member which has formed the hollow sealing portion 30 can be removed from the core removing slit 24.

As shown in FIG. 1, the attaching base portion bottom side portion 21 is formed as a flat surface. The core removing slit 24 is formed from the upper connecting surface 18 which is connected with the vertical side upper portion 14 to the vicinity of the lower connecting surface 19 which is connected to the vertical side lower portion 16 in a longitudinal direction. According to the embodiment shown in FIG. 1, the core removing slit 24 is formed in a straight line, however, the slit 24 may be formed in a zig zag shape along the attaching base portion bottom side portion 21.

The connecting sheet 50 which covers the outer surface of the attaching base portion bottom side portion 21, crossing over the core removing slit 24. The connecting sheet 50 is fusion-bonded to the outer surface of the attaching base portion bottom side portion 21. The connecting sheet 50 is formed by olefin system synthetic resin material and the door weather strip 10 including the attaching base portion bottom side portion 21 is formed by EPDM (ethylene-propylene-diene) rubber materials. Both of these two materials are formed by the olefin system material by which the surface of the connecting sheet 50 facing the attaching base portion bottom side portion 21 and the outer surface of the attaching base portion bottom side portion 21 can be firmly fusion-bonded together.

By this structure, the connecting sheet 50 can prevent the core removing slit 24 from opening by crossing over the core removing slit 24. It is noted that the by fusion-bonding the connecting sheet 50 to the outer surface of the attaching base portion bottom side portion 21, both are firmly bonded and since the attachment is made by fusion-bonding only, as will be explained later, the bonding can be performed by using ultrasonic fusion-bonding machine to easily perform the attaching work.

Further, as shown in FIG. 12 and FIG. 13, when the connecting sheet 50 is fusion-bonded, a plurality of uneven portions 51 and a plurality of convex portions 52 are formed on the outer surface of the connecting sheet 50. According to the embodiment, as will be explained later, the connecting sheet 50 is pushed by the ultrasonic vibrator 60 of the ultrasonic fusion-bonding machine to firmly bond the connecting sheet 50 to the outer surface of the attaching base portion bottom side portion 21. Thus, the connecting sheet 50 can be surely attached to the outer surface of the attaching base portion bottom side portion 21 by fusion-bonding.

It is preferable to form the fusion-bonding area of the attaching base portion bottom side portion 21 to which the connecting sheet 50 is fusion-bonded, to be a flat surface. In such structure, the pushing force is applied evenly on the outer surface of the attaching base portion bottom side portion 21 to be closely brought into contact with the connecting sheet 50 and accordingly, the connecting sheet 50 can be surely pushed by the ultrasonic vibrator 60 to surely fusion-bond the outer surface of the attaching base portion bottom side portion 21 to the connecting sheet 50.

As shown in FIG. 13, the plurality of uneven portions 51 on the outer surface of the connecting sheet 50 is formed as a lattice shape. In this structure, the uneven portions 51 are formed widely on the surface of the connecting sheet 50 in the vertical directions and in the lateral directions and each peak of the convex portions 52 is formed to be a shape of pyramid to firmly and evenly fusion-bonding the connecting sheet 50 to the outer surface of the attaching base portion bottom side portion 21. Thus, the connecting sheet 50 can be surely attached to the outer surface of the attaching base portion bottom side portion 21 by fusion-bonding. It is noted that the lattice shape uneven portions 51 can be easily formed by forming the end surface of the ultrasonic vibrator 60 of the ultrasonic fusion-bonding machine to be a lattice shape.

Figure 4:
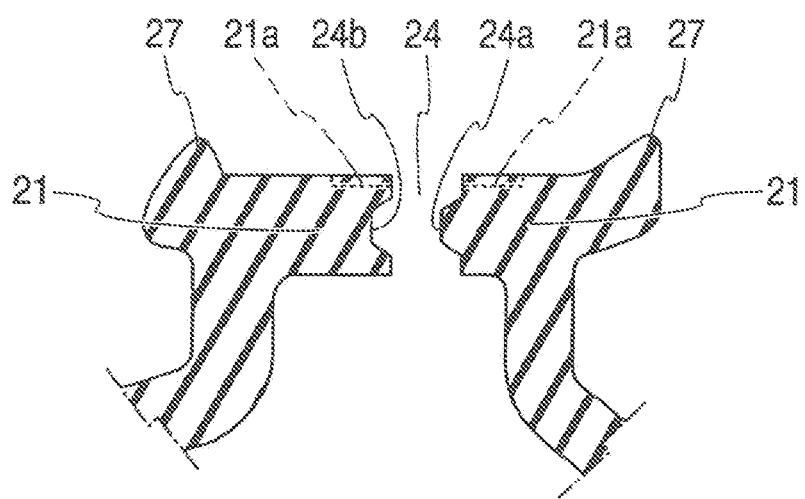
FIG. 4 is an enlarged cross section view of another attaching base portion bottom side portion of the door weather strip according to the embodiment.

As shown in FIGS. 4 an 5, the attaching base portion bottom side portion recessed portion 21a may be formed on the outer surface of the attaching base portion bottom side portion 21 for accommodating therein the connecting sheet 50. In this case, when the connecting sheet 50 is attached, the connecting sheet 50 is fitted into the attaching base portion bottom side portion recessed portion 21a. Thus, the connecting sheet 50 can be surely positioned at a predetermined position of the outer surface of the attaching base portion bottom side portion 21 for fusion-bonding.

Further, by accommodating the connecting sheet 50 in the attaching base portion bottom side portion recessed portion 21a, expanding of the connecting sheet 50 from the outer surface of the attaching base portion bottom side portion 21 can be minimized and the connecting sheet 50 attached to the outer surface of the attaching base portion bottom side portion 21 does not interfere the peripheral brim 6 of the opening of the vehicle body or the door frame 2 which is the opening and closing member for the opening of the vehicle body. Thus, the sealing performance between the outer surface of the attaching base portion bottom side portion 21 and the peripheral brim 6 of the opening of the vehicle body or the door frame 2 can be improved.

As shown in FIG. 1, the connecting sheet 50 can be formed by a plurality of rectangular strips crossing over the core removing slit 24 for covering the same. When the connecting sheet 50 is formed by a plurality of rectangular strips, only the necessary portion of the connecting sheet 50 may be fusion-bonded along the core removing slit 24 to improve the efficiency of fusion-bonding work.

Further, the connecting sheet 50 may be formed by an elongated sheet plate extending along the attaching base portion bottom side portion 21 in a longitudinal direction. When the connecting sheet 50 is formed by such elongated sheet plate extending along in a longitudinal direction of the attaching base portion bottom side portion 21, the elongated sheet shaped connecting sheet 50 can be attached to the attaching base portion bottom side portion 21 and the core removing slit 24 can be covered over the entire length hereof. This can improve the efficiency of work for arranging the connecting sheet 50 to the attaching base portion bottom side portion 21.

It is preferable to fusion-bond the connecting sheet 50 to the outer surface of the attaching base portion bottom side portion 21 consecutively in a width direction in both sides of the attaching base portion bottom side portion 21 by at least crossing over the core removing slit 24. In such case, since the core removing slit 24 and the outer surface of the attaching base portion bottom side portion 21 at both sides are consecutively fusion-bonded, generation of deviation between both side outer surfaces of the attaching base portion bottom side portion 21 can be suppressed and generation of step therebetween can be also suppressed and no cause of degrading the sealing performance is generated to surely prevent the core removing slit 24 from mouth-opening.

Further, only the center portion of the connecting sheet 50 is fusion-bonded and no specific ultrasonic vibrator is needed. Thus, the fusion-bonding work can be easily performed to surely prevent the core removing slit 24 from mouth-opening. It is also preferable that not only the central portion, but also over the entire surface of the connecting sheet 50 is fusion-bonded to the outer surface of the attaching base portion bottom side portion 21.

As shown in FIG. 3, it is preferable to form reinforcement ribs 26 at the inner surface of both sides of the core removing slit 24 of the attaching base portion bottom side portion 21 in the molding formed portion 10b. In such case, as will be explained later, by closely attaching the connecting sheet 50 to be in contact with the outer surface of the attaching base portion bottom side portion 21 and the attaching base portion bottom side portion 21 is held by the reinforcement ribs 26 when pushed to thereby minimize the deformation of the attaching base portion bottom side portion 21. Thus, the connecting sheet 50 can be surely fusion-bonded to the attaching base portion bottom side portion 21.

As shown in FIG. 4, the opening surface of the core removing slit 24 of the attaching base portion bottom side portion 21 can be formed such that the core removing slit convex portion 24a and the core removing slit recessed portion 24a face to each other. In such case, the core removing slit convex portion 24a can be fitted into the core removing slit recessed portion 24a not to have deviation of the opening surface at both sides of the core removing slit 24 when attaching the connecting sheet 50 to the outer surface of the attaching base portion bottom side portion 21 and accordingly, not to generate a step at the outer surface of attaching base portion bottom side portion 21. Thus, the connecting sheet 50 can be surely fusion-bonded to the both sides of the core removing slit 24.

Figure 5:
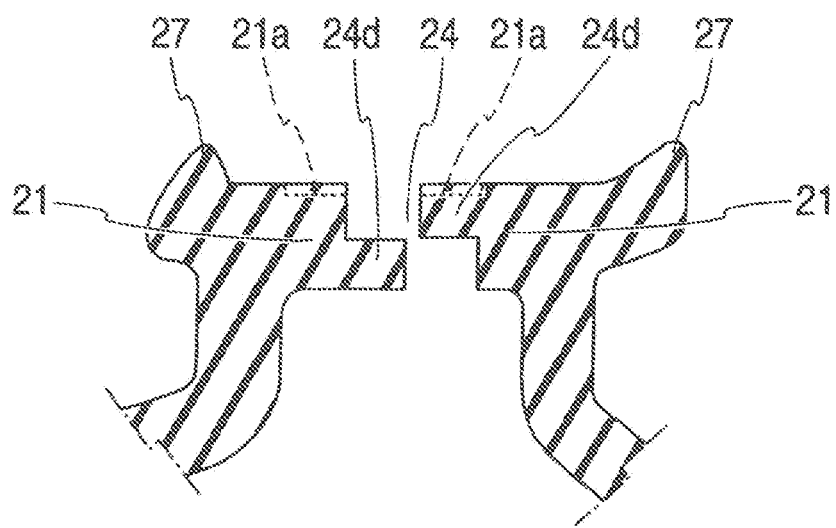
FIG. 5 is an enlarged cross section view of another attaching base portion bottom side portion of the door weather strip according to the embodiment.

Further, as shown in FIG. 5, the opening surface of the core removing slit 24 of the attaching base portion bottom side portion 21 can be formed such that the core removing slit stepped portion 24d and the core removing slit stepped portion 24d engage with each other. In such case, the core removing slit stepped portion 24d can engage with the core removing slit stepped portion 24d not to have deviation of the opening surface at both sides of the core removing slit 24 when attaching the connecting sheet 50 to the outer surface of the attaching base portion bottom side portion 21 and accordingly, not to generate a step at the outer surface of attaching base portion bottom side portion 21. Thus, the connecting sheet 50 can be surely fusion-bonded to the both sides of the core removing slit 24.

It is preferable to form the connecting sheet 50 by a polyethene and to form the door weather strip 10 entirely, including the attaching base portion 20 by the EPDM rubber materials. In this case, since the connecting sheet 50 and the attaching base portion bottom side portion 21 are formed by olefin system materials and accordingly, the connecting sheet 50 and the attaching base portion bottom side portion 21 are firmly fusion-bonded together.

It is noted that the connecting sheet 50 can be formed by another olefin system synthetic resin material other than polyethylene material. Further it is noted that the door weather strip 10 may be formed by another olefin system rubber or the olefin system plastic elastomer other than the EPDM rubber.

Next, the embodiment of the corner portion 12 shown in FIG. 2 will be explained. This embodiment indicates the molding formed portion 10b at the corner portion 12 and this embodiment is different from the vertical side connecting portion 15 of the first embodiment in FIG. 1 in the structure that the molding formed portion 10b is bent at approximately right angle and formed as the corner portion 16. The other structures are the same.

The core removing slit 24 is provided at the attaching base portion 20 in the corner portion 12 and the connecting sheet 50 is provided, crossing over the core removing slit 24. The connecting sheet 50 is fusion-bonded, covering the outer surface side of the attaching base bottom side portion 21. The connecting sheet 50 can be used as in either the rectangular strip shape or the elongated sheet shape. When the elongated sheet shape connecting sheet 50 is used, connecting sheet 50 can be fusion-bonded per every side bent at approximately right angle.

Figure 8:
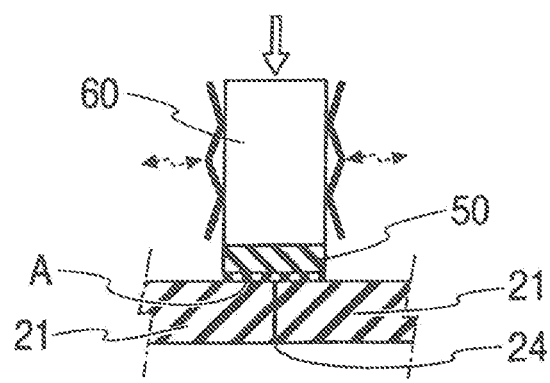
FIG. 8 is a schematic view of a process for fusion-bonding the connecting sheet to the attaching base portion bottom side portion of the door weather strip according to the embodiment of the invention, and showing a schematic view of a fusion-bonding process of the vibrator of ultrasonic fusion-bonding machine.

Next, the method for attaching the connecting sheet 50 to the outer surface of the attaching base bottom side portion 21 by fusion-bonding will be explained with reference to FIGS. 8 through 13. FIG. 8 is a schematic view of a process of fusion-bonding in which the connecting sheet 50 is fusion-bonded to the attaching base bottom side portion 21 of the door weather strip 10 by the ultrasonic vibrator 60.

Under the state that the core removing slit 24 open to the attaching base bottom side portion 21 is closed, the connecting sheet 50 is placed on the attaching base bottom side portion 21 and the ultrasonic vibrator 60 is pushed down from upper side in a direction indicated with an arrow in FIG. 8 to push the connecting sheet 50 downward. Then, the portion indicated with "A" of the connecting sheet 50 is welded by the friction heat and fusion-bonded to the attaching base bottom side portion 21.

Figure 9:
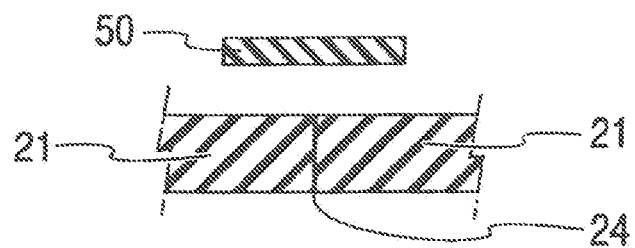
FIG. 9 is a schematic view of a process for fusion-bonding the connecting sheet to the attaching base portion bottom side portion of the door weather strip according to the embodiment of the invention, and showing a schematic view of a process showing the connecting sheet placed on the upper portion of the core removing slit.

In this process, as shown in FIG. 9, first, the connecting sheet 50 is placed to cross over the core removing slit 24 of the attaching base bottom side portion 21.

Figure 10:
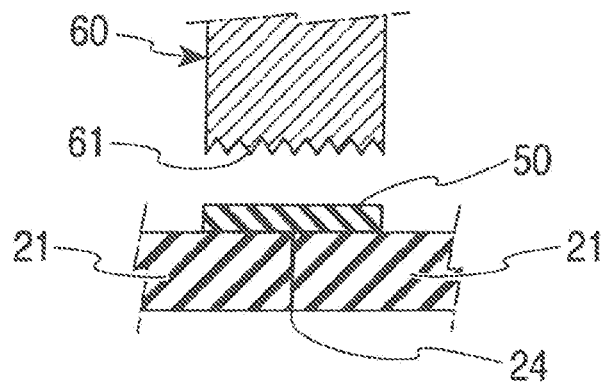
FIG. 10 is a schematic view of a process for fusion-bonding the connecting sheet to the attaching base portion bottom side portion of the door weather strip according to the embodiment of the invention, and showing a schematic view of a process showing the connecting sheet being closely brought into contact with the core removing slit.

Then, as shown in FIG. 10, the ultrasonic vibrator 60 is placed on the connecting sheet 50. The tip end of the ultrasonic vibrator 60 is formed with a pushing surface 61 which pushes the connecting sheet 50. According to this embodiment, the pushing surface 61 is formed in a lattice shape having a sharp top in a shape of pyramid. By forming the pushing surface 61 to have a shape as explained, the pushing surface 61 can surely bite into the connecting sheet 50 to surely hold the connecting sheet 50 to transmit the vibration to the fusion-bonding surface.

Next, as shown in FIG. 11, the tip end of the ultrasonic vibrator 60 pushes the connecting sheet 50 to vibrate the same to thereby fusion-bond the surface of the connecting sheet 50 facing the attaching base bottom side portion 21. Thus, the connecting sheet 50 is fusion-bonded.

Thereafter, when the ultrasonic vibrator 60 is separated from the connecting sheet 50, the connecting sheet 50 is fusion-bonded as shown in FIG. 12, and a lattice pattern is transferred to the front surface of the connecting sheet 50 and the lattice shape uneven portions 51 with the pyramid shape convex portions 52 are formed on the surface of the connecting sheet 50.

Regarding to the size of the connecting sheet 50, the thickness of the sheet with about 0.15 mm is used. In such case, the pushing level of the ultrasonic vibrator 60 for pushing the connecting sheet 50 is about the depth of about 0.5 to 1.5 mm. The thickness of the connecting sheet 50 at the uneven portion 51 is about 40 to 60 μm and the strength thereof is sufficient to prevent the mouth-opening of the core removing slit 24.

FIG. 13 shows the plan view of the part of the connecting sheet 50 and the uneven portion 51 is formed on the front surface of the connecting sheet 50 in a lattice shape and the convex portion 52 is formed in a shape of pyramid to generate the lattice shape. The uneven portion 51 is strongly pushed to the attaching base portion bottom side portion 21 to firmly fusion-bond. It is noted that as shown in FIG. 13, it is preferable to at least fusion-bond a part of the connecting sheet side end 53 which is the end portion of the connecting sheet 50, crossing over the core removing slit 24.

In the drawings:
10: door weather strip
10b: molding formed portion,
20: attaching base portion,
21: attaching base portion bottom side portion,
24: core removing slit,
50: connecting sheet,
60: ultrasonic vibrator

The invention claimed is:

1. A weather strip for an automobile that seals between a peripheral brim of an opening of a vehicle body of the automobile and an opening and closing member for the opening of the vehicle body comprising:
   an extrusion-formed portion; and
   a molding-formed portion that connects end portions of the extrusion formed portion, wherein the extrusion formed portion and the molding formed portion respectively include:
   an attaching base portion attached to an outer peripheral portion of the opening and closing member or the peripheral brim of the opening of the vehicle body; and
   a sealing portion formed integrally with the attaching base portion for sealing between the peripheral brim of the opening of the vehicle body and the opening and closing member, by being brought into contact with either the peripheral brim of the opening of the vehicle body or an outer peripheral portion of the opening and closing member, wherein
   the attaching base portion has an attaching base portion bottom side portion that faces the outer peripheral portion of the opening and closing member or the peripheral brim of the opening of the vehicle body,
   a core removing slit extending in a longitudinal direction of the weather strip for the automobile is formed at the attaching base portion bottom side portion of the molding formed portion;
   a connecting sheet is provided which covers an outer surface of the attaching base portion bottom side portion by crossing over the core removing slit,
   the connecting sheet is formed by an olefin resin,
   a surface of the connecting sheet facing the attaching base portion bottom side portion is fusion-bonded to the outer surface of the attaching base portion bottom side portion, a plurality of uneven portions is formed on an outer surface of the connecting sheet, and the plurality of uneven portions of the connecting sheet is formed in a lattice shape.

2. The weather strip for an automobile according to claim 1, wherein an attaching base portion bottom side portion recessed portion is provided on the outer surface of the attaching base portion bottom side portion for accommodating therein the connecting sheet.

3. The weather strip for an automobile according to claim 1, wherein the connecting sheet is formed by a plurality of rectangular strips to cover the core removing slit.

4. The weather strip for an automobile according to claim 1, wherein the connecting sheet is fusion-bonded to the outer surface of the attaching base portion bottom side portion, by crossing over the core removing slit and extending consecutively in a width direction in both sides of the attaching base portion bottom side portion.

5. The weather strip for an automobile according to claim 1, wherein a fusion-bonding area of the attaching base portion bottom side portion to which the connecting sheet is fusion-bonded is formed in a flat shape.

6. The weather strip for an automobile according to claim 1, wherein a reinforcement rib is provided on an inner surface of the attaching base portion bottom side portion at both sides with respect to the core removing slit.

7. The weather strip for an automobile according to claim 1, wherein an opening surface of the core removing slit of the attaching base portion bottom side portion is formed with an engaging portion formed in an uneven surface or a stepped surface.

8. The weather strip for an automobile according to claim 1, wherein the connecting sheet is formed by a polyethylene material and the weather strip is formed by an EPDM rubber material.

9. A weather strip for an automobile that seals between a peripheral brim of an opening of a vehicle body of the automobile and an opening and closing member for the opening of the vehicle body comprising:

an extrusion-formed portion; and a molding-formed portion that connects end portions of the extrusion formed portion, wherein the extrusion formed portion and the molding formed portion respectively include:

an attaching base portion attached to an outer peripheral portion of the opening and closing member or the peripheral brim of the opening of the vehicle body; and a sealing portion formed integrally with the attaching base portion for sealing between the peripheral brim of the opening of the vehicle body and the opening and closing member, by being brought into contact with either the peripheral brim of the opening of the vehicle body or an outer peripheral portion of the opening and closing member, wherein the attaching base portion has an attaching base portion bottom side portion that faces the outer peripheral portion of the opening and closing member or the peripheral brim of the opening of the vehicle body, a core removing slit extending in a longitudinal direction of the weather strip for the automobile is formed at the attaching base portion bottom side portion of the molding formed portion;

a connecting sheet is provided which covers an outer surface of the attaching base portion bottom side portion by crossing over the core removing slit, the connecting sheet is formed by an olefin resin and at the same time a surface of the connecting sheet facing the attaching base portion bottom side portion is fusion-bonded to the outer surface of the attaching base portion bottom side portion, and an attaching base portion bottom side portion recessed portion is provided on the outer surface of the attaching base portion bottom side portion for accommodating therein the connecting sheet.

10. The weather strip for an automobile according to claim 9, wherein a plurality of uneven portions is formed on an outer surface of the connecting sheet.

11. The weather strip for an automobile according to claim 10, wherein the plurality of uneven portions of the connecting sheet is formed in a lattice shape.

12. The weather strip for an automobile according to claim 9, wherein the connecting sheet is formed by a plurality of rectangular strips to cover the core removing slit.

13. The weather strip for an automobile according to claim 9, wherein the connecting sheet is fusion-bonded to the outer surface of the attaching base portion bottom side portion, by crossing over the core removing slit and extending consecutively in a width direction in both sides of the attaching base portion bottom side portion.

14. The weather strip for an automobile according to claim 9, wherein a fusion-bonding area of the attaching base portion bottom side portion to which the connecting sheet is fusion-bonded is formed in a flat shape.

15. The weather strip for an automobile according to claim 9, wherein a reinforcement rib is provided on an inner surface of the attaching base portion bottom side portion at both sides with respect to the core removing slit.

16. The weather strip for an automobile according to claim 9, wherein an opening surface of the core removing slit of the attaching base portion bottom side portion is formed with an engaging portion formed in an uneven surface or a stepped surface.

17. The weather strip for an automobile according to claim 9, wherein the connecting sheet is formed by a polyethylene material and the weather strip is formed by an EPDM rubber material.

* * * * *